(12) United States Patent
Fujishiro et al.

(10) Patent No.: US 6,917,354 B2
(45) Date of Patent: Jul. 12, 2005

(54) FLUORESCENT LAMP, FLUORESCENT LAMP UNIT, LIQUID CRYSTAL DISPLAY DEVICE, AND METHOD OF EMITTING LIGHT

(75) Inventors: Fumihiko Fujishiro, Tokyo (JP); Masatake Baba, Tokyo (JP); Syuuki Yamamori, Tokyo (JP)

(73) Assignee: NEC LCD Technologies, Inc., Kanagawa (JP)

( * ) Notice: Subject to any disclaimer, the term of this patent is extended or adjusted under 35 U.S.C. 154(b) by 279 days.

(21) Appl. No.: 10/074,756

(22) Filed: Feb. 12, 2002

(65) Prior Publication Data

US 2002/0154258 A1 Oct. 24, 2002

(30) Foreign Application Priority Data

Feb. 13, 2001 (JP) ........................................ 2001-036028
Jan. 11, 2002 (JP) ........................................ 2002-004482

(51) Int. Cl.[7] ................................................ G09G 3/36
(52) U.S. Cl. ............................ 345/102; 345/87; 345/88
(58) Field of Search ............................... 345/74, 87, 52, 345/88, 102, 211; 313/487, 610, 582; 348/790; 315/169.1, 4; 427/575

(56) References Cited

U.S. PATENT DOCUMENTS

| | | | | |
|---|---|---|---|---|
| 5,122,791 A | * | 6/1992 | Gibbons et al. | 345/102 |
| 5,592,193 A | * | 1/1997 | Chen | 345/102 |
| 5,629,054 A | * | 5/1997 | Kanai | 427/575 |
| 5,811,924 A | * | 9/1998 | Okumura et al. | 313/487 |
| 5,854,662 A | * | 12/1998 | Yuyama et al. | 348/790 |
| 6,060,828 A | | 5/2000 | Vollkommer et al. | |
| 6,096,389 A | * | 8/2000 | Kanai | 427/575 |
| 6,348,762 B1 | * | 2/2002 | Nunomura et al. | 313/582 |
| 6,407,509 B1 | * | 6/2002 | Ikeda et al. | 315/169.4 |
| 6,580,227 B2 | * | 6/2003 | Kobayashi | 315/169.4 |
| 6,636,190 B2 | * | 10/2003 | Hirakata et al. | 345/74.1 |
| 6,657,396 B2 | * | 12/2003 | Nakada et al. | 315/169.1 |
| 6,713,958 B2 | * | 3/2004 | Oniki | 313/582 |

FOREIGN PATENT DOCUMENTS

| | | | |
|---|---|---|---|
| JP | 07-296775 | * | 11/1995 |
| JP | 10-222083 | | 8/1998 |
| JP | 2000-500277 | | 1/2000 |
| JP | 2000-500916 | | 1/2000 |
| JP | 2000-500917 | | 1/2000 |
| JP | 2000-90884 | | 3/2000 |
| JP | 2000-503801 | | 3/2000 |
| JP | 2002-93379 | | 3/2002 |

* cited by examiner

Primary Examiner—Vijay Shankar
Assistant Examiner—Prabodh Dharia
(74) Attorney, Agent, or Firm—Choate, Hall & Stewart LLP

(57) ABSTRACT

A liquid crystal display device has a fluorescent lamp and a driving circuit as a back light. A closed container, a discharge gas sealed in the closed container, first discharge electrodes, and second discharge electrodes are included in the fluorescent lamp. The driving circuit repeats a first step of causing electric discharge in first discharge areas by applying a voltage having a negative polarity to the first discharge electrodes and a voltage having a positive polarity to the second discharge electrodes, and a second step of causing electric discharge in second discharge areas which are different from the first discharge areas by applying a voltage having a positive polarity to the first discharge electrodes and a voltage having a negative polarity to the second discharge electrodes.

31 Claims, 14 Drawing Sheets

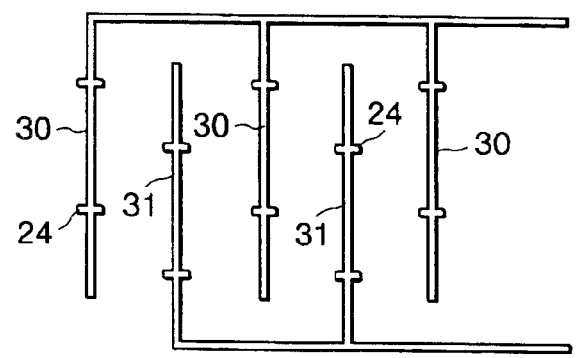
FIG.6
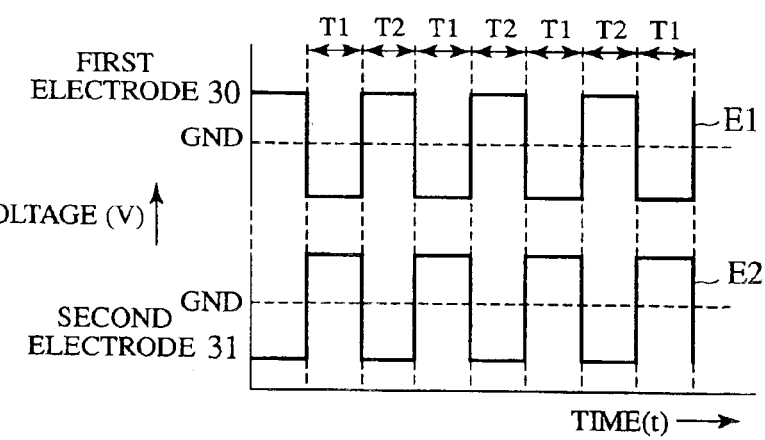
FIG.7A
FIG.7B

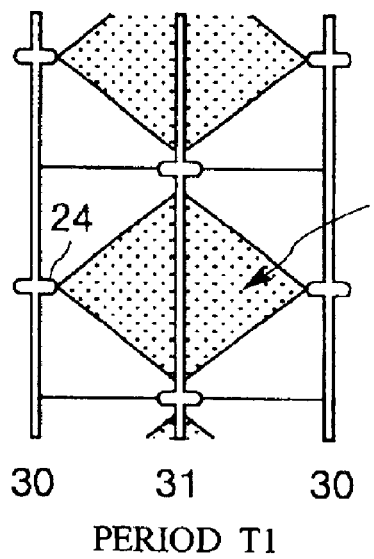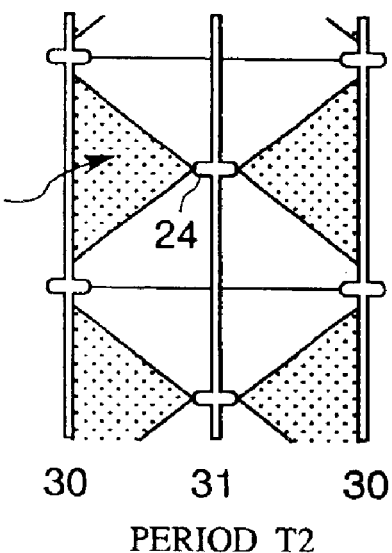
FIG.8A — PERIOD T1
FIG.8B — PERIOD T2

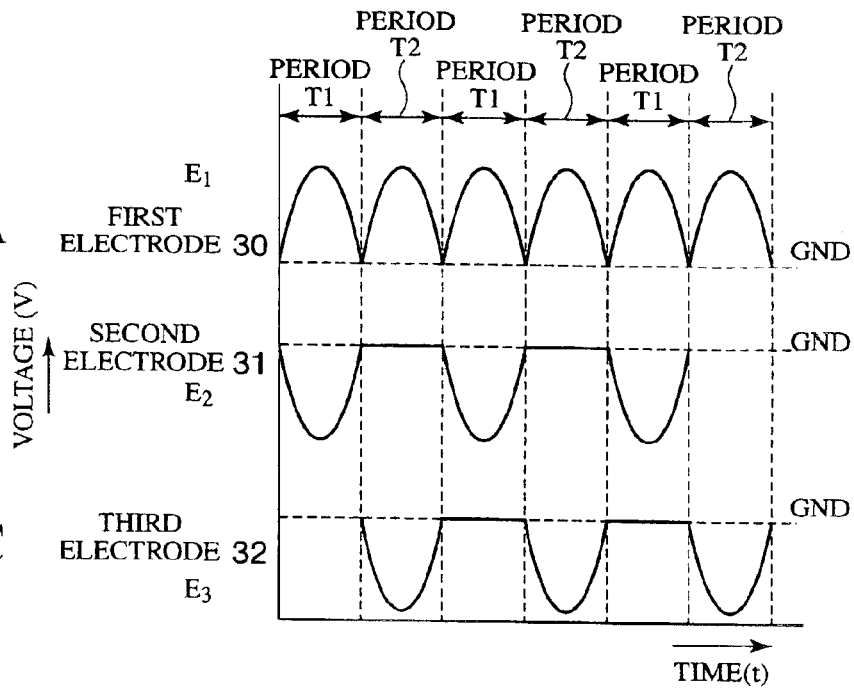
FIG.13A FIRST ELECTRODE 30
FIG.13B SECOND ELECTRODE 31
FIG.13C THIRD ELECTRODE 32
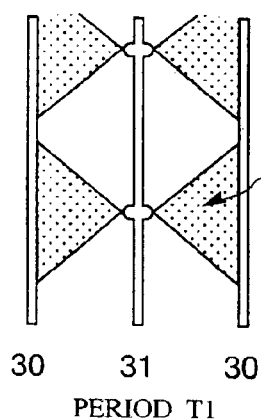
FIG.14A
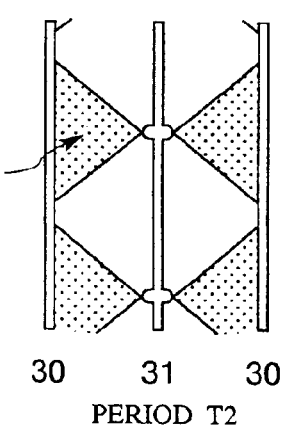
FIG.14B

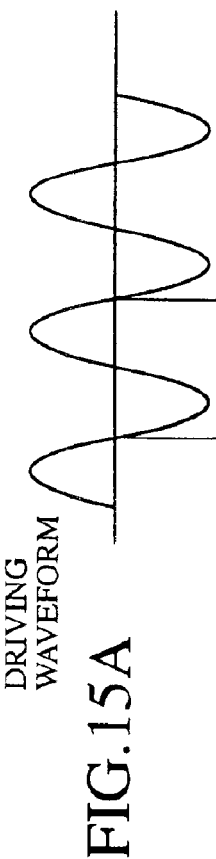
FIG.15A DRIVING WAVEFORM
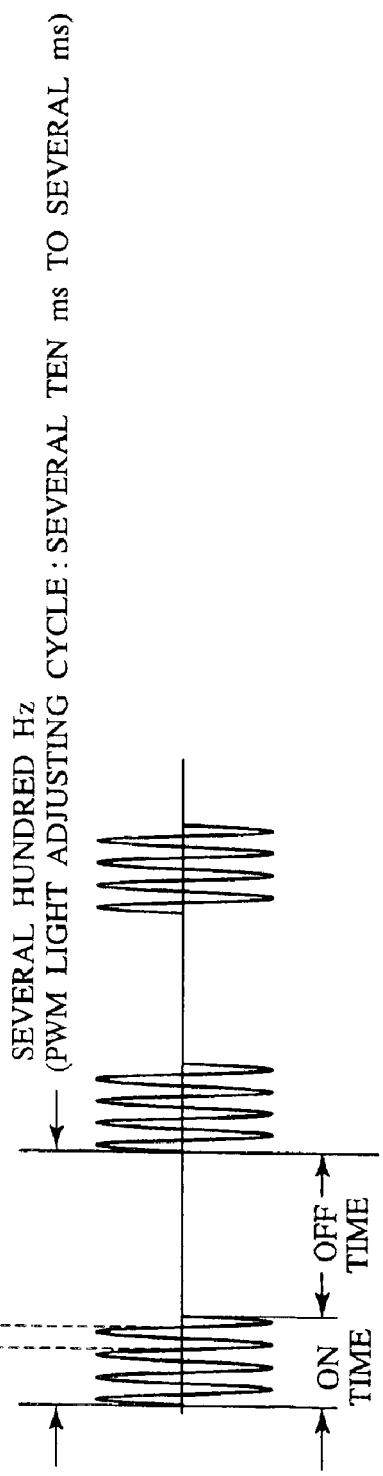
FIG.15B
FREQUENCY: SEVERAL TEN kHz TO SEVERAL HUNDRED kHz
(CYCLE: SEVERAL TEN μs TO SEVERAL HUNDRED μs)
SEVERAL HUNDRED Hz
(PWM LIGHT ADJUSTING CYCLE: SEVERAL TEN ms TO SEVERAL ms)
FOR EXAMPLE, 10% LIGHT ADJUSTING DEGREE MEANS
EQUATION "ON TIME / PWM LIGHT ADJUSTING CYCLE = 10%" IS SATISFIED

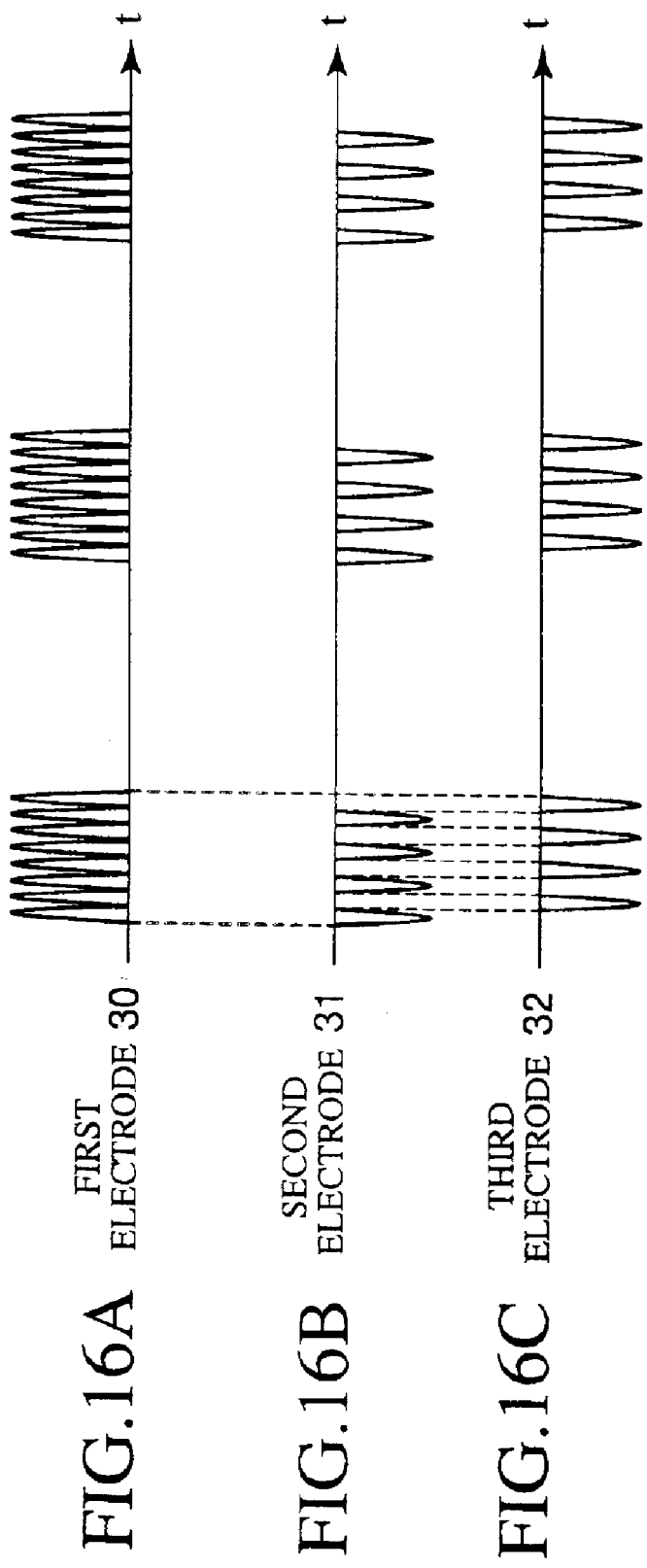

30  31  30  31

30  31  30  31

FLUORESCENT LAMP, FLUORESCENT LAMP UNIT, LIQUID CRYSTAL DISPLAY DEVICE, AND METHOD OF EMITTING LIGHT

BACKGROUND OF THE INVENTION

1. Field of the Invention

The present invention relates to a fluorescent lamp, and a display device which comprises the fluorescent lamp as a lighting device.

2. Description of the Related Art

A transparent liquid crystal display device and a semi-transparent liquid crystal display device need a back light. There are roughly two types of back light. One is an edge type, and the other is an underside type.

According to the edge type, a fluorescent lamp is arranged at the edge of a liquid crystal display panel. Light emitted from the fluorescent lamp is guided toward the back of the liquid crystal display panel by a light guiding plate, and is then entered the liquid crystal display panel.

In case of the edge type, it is hardly accomplished to uniformly guide light from the fluorescent lamp toward the back of the liquid crystal display panel efficiently.

As one method of the underside type, it is known to arrange a plurality of fluorescent lamps in line behind a liquid crystal display panel. In case of such an underside type, if the fluorescent lamps are arranged too close to the liquid crystal display panel, it causes unevenness of the light intensity over the liquid crystal display panel.

Flat panel fluorescent lamps have been proposed as one suitable for the underside type. One example of flat panel fluorescent lamp is disclosed in International Publication No. WO98/11596. The disclosure of International Publication No. WO98/11596 is incorporated herein by reference in its entirety.

FIGS. 1A and 1B are identical to FIGS. 6a and 6b included in International Publication No. WO98/11596. FIG. 1A shows a partially cutaway plan view of a flat panel fluorescent lamp, and FIG. 1B shows a cross section of the fluorescent lamp. In FIGS. 1A and 1B, a numeral 58 denotes a cathode, and a numeral 59 denotes an anode. As illustrated, a plurality of cathodes 58 and anodes 59 are arranged by turns in parallel on a bottom plate glass 60.

Voltages are applied to the cathodes 58 and the anodes 59 at timings shown in FIG. 2. Then, in a period T1 during which a positive voltage is applied to the anodes 59 and a negative voltage is applied to the cathodes 58, electric discharge is caused in triangle areas formed by projections 68 of the cathodes 58 as the vertexes, and the anodes 59 as the bases, as shown in FIG. 3. By the electric discharge, ultraviolet rays are emitted from a rare as sealed inside the fluorescent lamp. The ultraviolet rays enter a fluorescent layer 63 which is painted over the internal surface of an upper plate glass 61, and become visible light. A period T1 shown in FIG. 2 is a period during which electric discharge is caused between the anodes 59 and the cathodes 58. On the other hand, a period T2 is an afterglow period during which electric discharge is not caused. Atoms and electrons of the gas sealed inside the lamp are combined back together in a period T2. Light emission efficiency can be improved with an appropriate setting of periods T2.

Such a flat panel fluorescent lamp has an advantage of reduced unevenness of light intensity, as compared to the above-described line-arranged fluorescent lamps.

Similar flat panel fluorescent lamps are disclosed in International Publications No. WO98/43276, No. WO98/43277, and No. WO98/43278. Those disclosures are incorporated herein by reference in their entireties.

Those flat panel fluorescent lamps have following problems.

Since electric discharge is caused from the projection 68 as a vertex, a light radiation area is narrowed, thereby causing unevenness of light intensity. Thus, in case of using a flat panel fluorescent lamp as a back light of a liquid crystal display device, it is required to adjust the thickness of diffusion plates to be inserted between the fluorescent lamp and the liquid crystal display panel, or to provide a space between the flat panel fluorescent lamp and the diffusion plates in order to reduce unevenness of light intensity.

However, use of many diffusion plates or large space between the liquid crystal display panel and the fluorescent lamp increases the total thickness of the liquid crystal display device. And increase in the weight of the diffusion plate, increases the weight of the fluorescent lamp, and further increases the weight of the liquid crystal display device.

SUMMARY OF THE INVENTION

The present invention was made in view of the above-described problems of the prior art, and it is an object of the present invention to provide a fluorescent lamp which achieves reduced unevenness of light intensity.

To accomplish the above object, a fluorescent lamp according to a first aspect of the present invention comprises:

a first substrate;

a second substrate which is arranged so as to face the first substrate;

a discharge gas which is sealed between the first substrate and the second substrate; and a plurality of discharge electrodes which are arranged on the first substrate and/or the second substrate, wherein the fluorescent lamp emits light by causing electric discharge in different areas alternated in accordance with voltages applied to the plurality of discharge electrodes.

To accomplish the above object, a fluorescent lamp unit according to a second aspect of the present invention comprises:

a fluorescent lamp according to the first aspect; and a driving circuit which drives the fluorescent lamp by applying drive voltages to the discharge electrodes of the lamp.

The plurality of discharge electrodes may include a group of first discharge electrodes, and a group of second discharge electrodes.

In this case, the driving circuit may repeat a first step and a second step. The first step causes electric discharge in first discharge areas between the first discharge electrodes and the second discharge electrodes by applying a voltage having a negative polarity to the first discharge electrodes and applying a voltage having a positive polarity to the second discharge electrodes. The second step causes electric discharge in second discharge areas which are different from the first discharge areas at least partially and which are between the first discharge electrodes and the second discharge electrodes by applying a voltage having a positive polarity to the first discharge electrodes and applying a voltage having a negative polarity to the second discharge electrodes.

The plurality of discharge electrodes may include a group of first discharge electrodes and a group of second discharge electrodes.

In this case, the first discharge electrodes and the second discharge electrodes may respectively have projections. And the projections of the first discharge electrodes and the projections of the second discharge electrodes may be arranged so as not to face the projections of the other group of discharge electrodes.

The driving circuit may apply drive voltages having polarities which are changed oppositely from each other to the first discharge electrodes and the second discharge electrodes.

Both of the first discharge electrodes and the second discharge electrodes may be arranged on the first substrate. Or, the first discharge electrodes may be arranged on the first substrate, and the second discharge electrodes may be arranged on the second substrate.

In a case where a voltage having a negative polarity is applied to the first discharge electrodes and a voltage having a positive polarity is applied to the second discharge electrodes, electric discharge may be caused in first discharge areas which are between the projections of the first discharge electrodes and the second discharge electrodes. And in a case where a voltage having a positive polarity is applied to the first discharge electrodes and a voltage having a negative polarity is applied to the second discharge electrodes, electric discharge may be caused in second discharge areas which are different from the first discharge areas at least partially and which are between the projections of the second discharge electrodes and the first discharge electrodes.

The plurality of discharge electrodes may include a group of first discharge electrodes, a group of second discharge electrodes, and a group of third discharge electrodes.

In this case, the driving circuit may repeat a first discharge step and a second discharge step. The first discharge step causes electric discharge in first discharge areas between the first discharge electrodes and the second discharge electrodes by applying a drive voltage of a positive potential to one of the groups of the first discharge electrodes and second discharge electrodes and applying a drive voltage of a negative potential to the other of the groups of the first discharge electrodes and second discharge electrodes. The second discharge step causes electric discharge in second discharge areas which are different from the first discharge areas at least partially and which are between the first discharge electrodes and the third discharge electrodes by applying a drive voltage of a positive potential to one of the groups of the first discharge electrodes and third discharge electrodes and applying a drive voltage of a negative potential to the other of the groups of the first discharge electrodes and third discharge electrodes.

The plurality of discharge electrodes may include a group of first discharge electrodes, a group of second discharge electrodes, and a group of third discharge electrodes.

In this case, the first discharge electrodes and the second discharge electrodes may be arranged on the first substrate, and the third discharge electrodes may be arranged on the second substrate.

And in this case, the group of the second discharge electrodes and the group of the third discharge electrodes may respectively have projections which are arranged so as not to overlap with the projections of the other group.

The third discharge electrodes may be arranged on the second substrate so as to almost face the second discharge electrodes.

The driving circuit may apply a drive voltage of a negative potential to the second discharge electrodes and the third discharge electrodes alternately. And while applying a drive voltage of a negative potential to the second discharge electrodes or the third discharge electrodes, the driving circuit may apply a drive voltage of a positive potential to the first discharge electrodes.

To accomplish the above object, a liquid crystal display device according to a third aspect of the present invention comprises the fluorescent lamp unit according to the second aspect as a back light.

The fluorescent lamp may emit light by causing electric discharge in first discharge areas between the first discharge electrodes and the second discharge electrodes and in second discharge areas which are different from the first discharge areas at least partially and which are between the first discharge electrodes and the third discharge electrodes selectively in accordance with polarities of voltages applied to the plurality of discharge electrodes.

The driving circuit may apply to the plurality of discharge electrodes, drive voltages for turning on both of the first and second discharge areas when light intensity of the back light is at a maximum level, and drive voltages for turning off one of the first and second discharge areas when light intensity of the back light is at a minimum level.

The driving circuit may apply to the plurality of discharge electrodes, drive voltages for controlling the first and second discharge areas to emit light during 50% of a predetermined period, when light intensity of the back light is at a maximum level.

The driving circuit may apply to the plurality of discharge electrodes, drive voltages for turning on one of the first and second discharge areas and also for controlling the discharge areas which are turned on to emit light during 10% of a predetermined period, when light intensity of the back light is at a minimum level.

The driving circuit may control one of the first and second discharge areas to emit light by causing electric discharge during 20% of a predetermined period, when light intensity of the back light is at a minimum level.

The driving circuit may control both of the first and second discharge areas to emit light by causing electric discharge during 100% of a predetermined period, when light intensity of the back light is at a maximum level.

To accomplish the above object, a fluorescent lamp unit according to a fourth aspect of the present invention comprises a reflection film in addition to the components of the fluorescent lamp which is included in the fluorescent lamp unit according to the second aspect, wherein the reflection film is adhered to the first substrate.

To accomplish the above object, a fluorescent lamp unit according to a fifth aspect of the present invention comprises the same components as those of the fluorescent lamp unit according to the second aspect, wherein the second or third discharge electrodes are made of a transparent conductive material in a case where they are arranged on the second substrate.

To accomplish the above object, a method of emitting light according to a sixth aspect of the present invention employs a lamp (back light) in which a discharge gas is sealed, and first and second discharge electrodes are formed, the method comprising:

causing electric discharge in first discharge areas between the first and second discharge electrodes by applying a voltage having a negative polarity to the first discharge electrodes and a voltage having a positive polarity to the second discharge electrodes, and converting ultraviolet rays caused by the electric discharge into visible light through a phosphor;

causing electric discharge in second discharge areas which are different from the first discharge areas at least partially and which are between the first and second discharge electrodes by applying a voltage having a positive polarity to the first discharge electrodes and a voltage having a negative polarity to the second discharge electrodes, and converting ultraviolet rays caused by the electric discharge into visible light through the phosphor; and controlling the causing electric discharge in the first discharge areas and the causing electric discharge in the second discharge areas to be repeated.

In the controlling, it may be controlled that drive voltages for turning on both of the first and second discharge areas are applied to the first and second discharge electrodes when light emission intensity is at a maximum level, and that drive voltages for turning off one of the first and second discharge areas are applied to the first and second discharge electrodes when light emission intensity is at a minimum level.

In the controlling, it may be controlled that drive voltages for turning on one of the first and second discharge areas and for controlling the discharge areas which are turned on to emit light during 10% of a predetermined period are applied to the first and second discharge electrodes when light intensity of the back light is at a minimum level.

In the controlling, one of the first and second discharge areas may be controlled to emit light by causing electric discharge during 20% of a predetermined period when light intensity of the back light is at a minimum level.

To accomplish the above object, a method of emitting light according to a seventh aspect of the present invention employs a lamp (back light) in which a discharge gas is sealed, and first discharge electrodes, second discharge electrodes, and third discharge electrodes are formed, the method comprising:

causing electric discharge in first discharge areas between the first and second discharge electrodes by applying a drive voltage of a positive potential to one of the first and second discharge electrodes and a drive voltage of a negative potential to the other of the first and second discharge electrodes, and converting ultraviolet rays caused by the electric discharge into visible light through a phosphor;

causing electric discharge in second discharge areas which are different from the first discharge areas at least partially and which are between the first and third discharge electrodes by applying a drive voltage of a positive potential to one of the first and third discharge electrodes and a drive voltage of a negative potential to the other of the first and third discharge electrodes, and converting ultraviolet rays caused by the electric discharge into visible light via the phosphor; and controlling the causing electric discharge in first discharge areas and the causing electric discharge in the second discharge areas to be repeated.

In the controlling, it may be controlled that drive voltages for turning on both of the first and second discharge areas are applied to the first to third discharge electrodes when light emission intensity is at a maximum level, and that drive voltages for turning off one of the first and second discharge areas are applied to the first to third discharge electrodes when light emission intensity is at a minimum level.

In the controlling, it may be controlled that drive voltages for turning on one of the first and second discharge areas and for controlling the discharge areas which are turned on to emit light during 10% of a predetermined period are applied to the first to third discharge electrodes when light intensity of the back light is at a minimum level.

In the controlling, one of the first and second discharge areas may be controlled to emit light by causing electric discharge during 20% of a predetermined period when light intensity of the back light is at a minimum level.

BRIEF DESCRIPTION OF THE DRAWINGS

These objects and other objects and advantages of the present invention will become more apparent upon reading of the following detailed description and the accompanying drawings in which:

FIG. 6 shows an example of a plain structure of discharge electrodes included in the flat panel fluorescent lamp according to the first embodiment;

FIGS. 7A and 7B show waveforms of voltages respectively applied to first electrodes and second electrodes of the flat panel fluorescent lamp according to the first embodiment;

FIGS. 8A and 8B show an example of discharge areas of the flat panel fluorescent lamp according to the first embodiment;

FIGS. 13A to 13C respectively show examples of waveforms of voltages to be applied to first to third electrodes of the flat panel fluorescent lamp according to the third embodiment;

FIGS. 14A and 14B show discharge area of the flat panel fluorescent lamp according to the third embodiment;

FIGS. 15A and 15B show diagrams which illustrate a concept of PWM light adjusting;

FIGS. 16A to 16C are diagrams showing images of drive voltages to be applied to first to third electrodes of the flat panel fluorescent lamp shown in FIG. 12 and FIGS. 12A and 12B;

DETAILED DESCRIPTION OF THE PREFERRED EMBODIMENTS

Embodiments of the present invention will be explained below with reference to the drawings.

First Embodiment

A flat panel fluorescent lamp according to a first embodiment and a liquid crystal display device which employs the flat panel fluorescent lamp as a back light will now be explained.

Figure 1A:
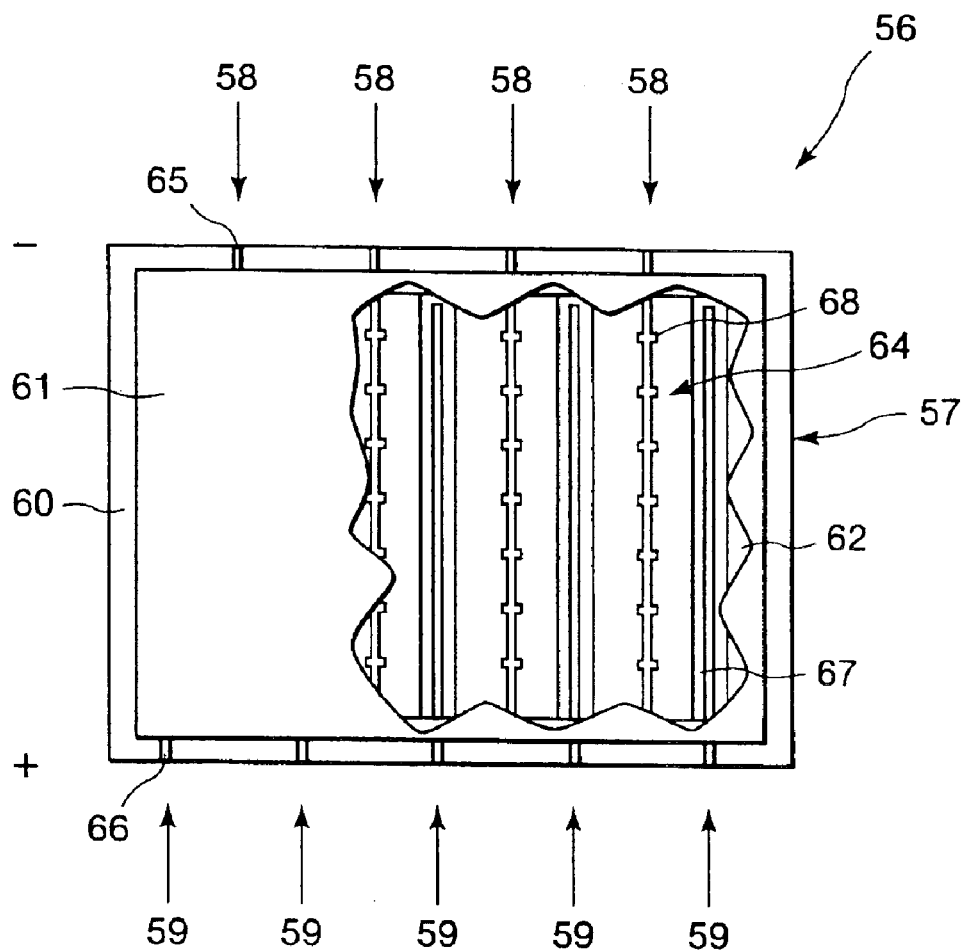
FIG. 1A shows a partially cutaway plan view of a conventional flat panel fluorescent lamp.
Figure 1B:
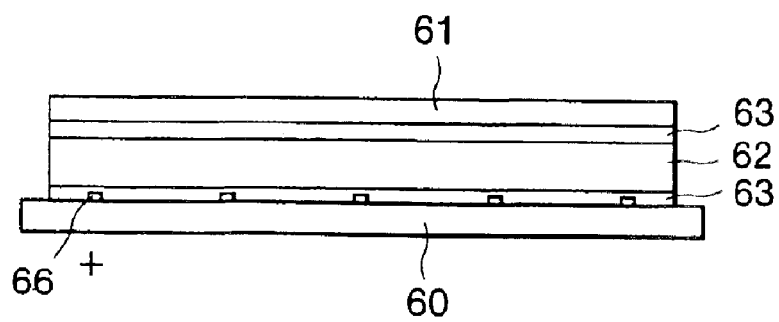
FIG. 1B shows a cross section of this fluorescent lamp.
Figure 2:
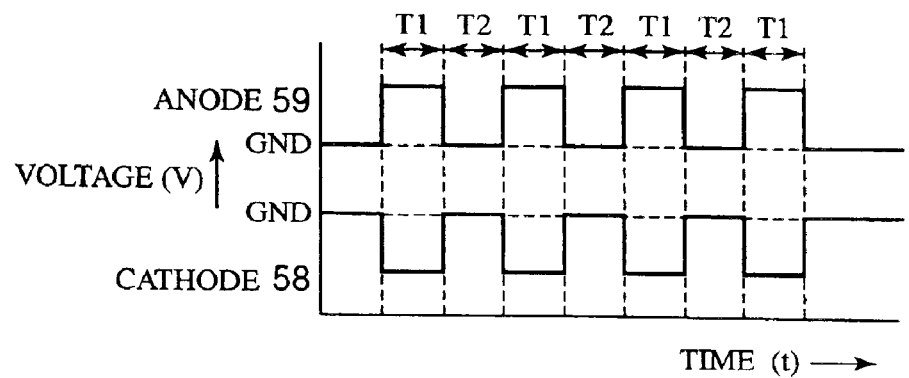
FIG. 2 shows waveforms of voltages respectively applied to cathodes and anodes included in the conventional flat panel fluorescent lamp shown in FIGS. 1A and 1B.
Figure 3:
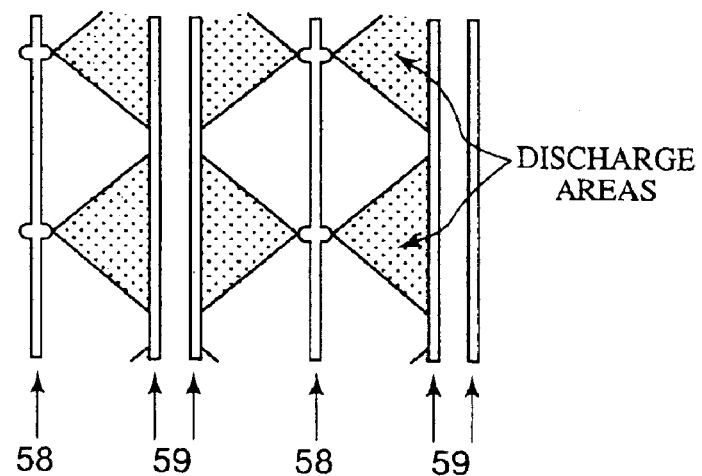
FIG. 3 shows discharge areas of the conventional flat panel fluorescent lamp shown in FIGS. 1A and 1B.
Figure 4:
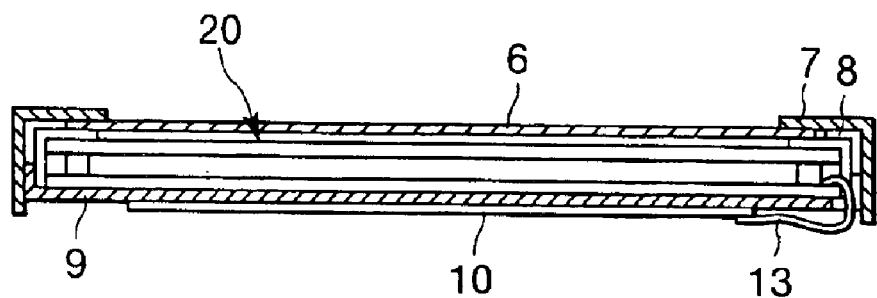
FIG. 4 shows a structure of a liquid crystal display device according to a first embodiment of the present invention.

As shown in FIG. 4, this liquid crystal display device comprises a liquid crystal display panel 6 and a flat panel fluorescent lamp 20. The liquid crystal display panel 6 and the flat panel fluorescent lamp 20 are held by a front chassis (case) 7, a center chassis 8, and a rear chassis 9. A circuit substrate 10 is attached at the back surface of the rear chassis 9. An inverter circuit which generates a voltage for driving the flat panel fluorescent lamp 20 is loaded (provided) on the circuit substrate 10. A power source cable 13 for transmitting electrical power form the inverter circuit to the flat panel fluorescent lamp 20 is connected to the circuit substrate 10 and the fluorescent lamp 20.

Figure 5:
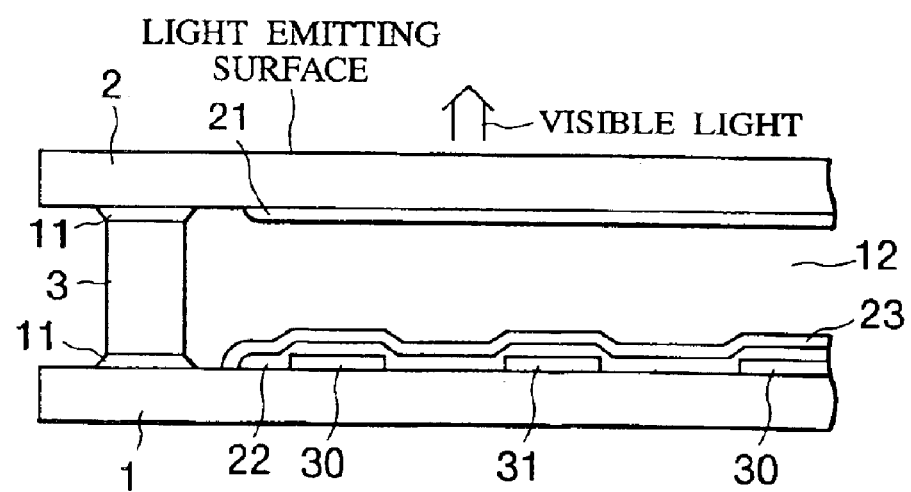
FIG. 5 shows a cross sectional structure of a flat panel fluorescent lamp according to the first embodiment.

FIG. 5 illustrates a cross sectional structure of the flat panel fluorescent lamp 20 in detail. FIG. 6 illustrates a plain structure of discharge electrodes.

As shown in FIG. 5 and FIG. 6, a plurality of first electrodes 30 and a plurality of second electrodes 31 are arranged alternately on a lower substrate 1 which is made of plastic or glass and has, for example, 2 mm thickness. As shown in FIG. 6, the plurality of first electrodes 30 and the plurality of second electrodes 31 are arranged in parallel with one another. The plurality of first electrodes 30 are mutually connected at one of the ends thereof. The plurality of second electrodes 31 are mutually connected at one the ends thereof.

Hereinafter, the total of the mutually connected first electrodes 30 is referred to as first group electrodes, and the total of the mutually connected second electrodes 31 is referred to as second group electrodes.

The first group electrodes and the second group electrodes have projections (discharge projections) 24 at predetermined intervals. The projections 24 provided to the first group electrodes and the projections 24 provided to the second group electrodes are arranged in a staggered state. In other words, the projections 24 are formed so as to project toward the both sides of each first electrode 30 and second electrode 31 (the left and right directions in FIG. 6). And the projections 24 of the first group electrodes face the extended or straight line portions of the adjacent second group electrodes, and the projections 24 of the second group electrodes face the extended or straight line portions of the adjacent first group electrodes. As shown in FIG. 5 and FIG. 6, the projections 24 are substantially coplaner with the discharge electrodes and extend in a direction different from a longitudinal axis of the discharge electrodes.

As shown in FIG. 5, a dielectric layer 22 is formed over the first electrodes 30 and the second electrodes 31. Further, a reflection film 23 is formed on the dielectric layer 22.

An upper substrate 2 is made of transparent insulation material such as plastic, glass, or the like and has, for example, 2 mm thickness. A fluorescent layer 21 is adhered to the internal surface of the upper substrate 2.

The lower substrate 1 and the upper substrate 2 are arranged so as to face each other with a distance of 4 mm, for example. A framework member (seal member) 3 connects the lower substrate 1 and the upper substrate 2 with the use of frit glasses (low melting point glasses) 11. Thus, a tightly closed (sealed) container is formed. Discharge gas 12 made of a rare gas, or a rare gas and mercury is sealed in this closed container.

A method of driving the flat panel fluorescent lamp 20 having the above-described structure will be explained. FIGS. 7A and 7B show waveforms of voltages applied to the first electrodes 30 and second electrodes 31 respectively. As shown in FIGS. 7A and 7B, during a period T1, a negative voltage is applied to the first electrodes 30, and a positive voltage is applied to the second electrodes 31, while during a period T2, a positive voltage is applied to the first electrodes 30, and a negative voltage is applied to the second electrodes 31. Two pulse waveforms having different polarities from each other are used in this driving method. However, the present invention is not limited to using such waveforms. A positive polarity half-wave rectified waveform and negative polarity half-wave rectified waveform of a sinusoidal waveform may be used instead. In other words, any waveforms that periodically reverse the polarities of voltages respectively applied to the first group electrodes and the second group electrodes may be used.

Voltages having the waveforms shown in FIGS. 7A and 7B are applied to the first electrodes 30 and the second electrodes 31 from the circuit substrate 10 through the cable 13. In this case, electric discharge is caused (or occurs) in triangle areas formed by the projections 24 of the first electrodes 30 as the vertexes, and the facing second electrodes 31 as the bases as shown in FIG. 8A during a period T1 (a period during which the first electrodes 30 act as cathodes and the second electrodes 31 act as anodes).

On the other hand, during a period T2 (a period during which the first electrodes 30 act as anodes and the second electrodes 31 act as cathodes), electric discharge is caused in triangle areas formed by the projections 24 of the second electrodes 31 as the vertexes, and the facing first electrodes 30 as the bases, as shown in FIG. 8B. Electric discharge is caused in different areas in consecutive two periods.

The discharge gas 12 sealed in the lamp is excited by the electric discharge to generate ultraviolet rays. The generated ultraviolet rays collide against the fluorescent layer 21 and emit (radiate) visible light.

The frequencies of the power source voltages shown in FIGS. 7A and 7B which are output from the circuit substrate 10 are, for example, 20 kHz to 600 kHz. Accordingly, the visible light generated by the two patterns of electric discharge respectively shown in FIG. 8A and FIG. 8B is recognized by human eyes as integrated visible light. Thus, the entire flat panel fluorescent plate is recognized to emit light all the time. Therefore, since an area approximately twice as large as that of a conventional flat panel fluorescent lamp is recognized to emit light, the flat panel fluorescent lamp according to this embodiment can reduce unevenness of light intensity when used as a back light of a liquid crystal display device. Further, unlike the conventional one, electric discharge occurs continuously. Therefore, the light intensity becomes approximately twice as large.

Since the thickness of diffusion plates can be made thinner than a conventional one, and a distance between the liquid crystal display panel 6 and the flat panel fluorescent lamp 20 can be shortened due to the reduced unevenness of the light intensity, a thin and light display device can be manufactured. And discharge areas are different between the period T1 and the period T2. Thus, atoms of the rare gas are recombined in areas in which electric discharge is not caused during one of the periods. Therefore, light emission efficiency is not greatly lowered as compared to a conventional one.

By adhering a reflection film 23 made of aluminum of the like to the surface of the lower substrate 1, it is possible to prevent light from leaking from the back of the liquid crystal display device. Thus, a lamp with a higher light emission efficiency can be obtained.

Figure 9:
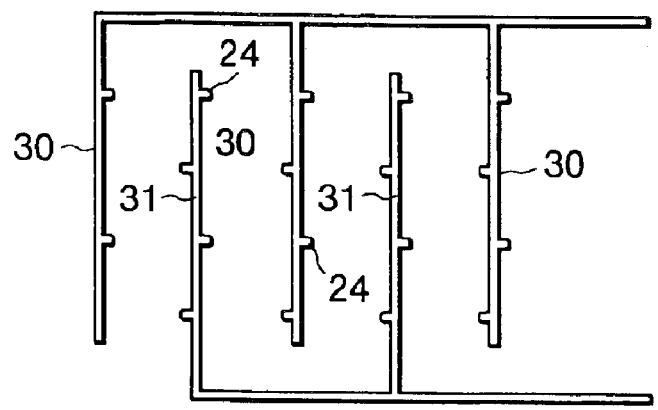
FIG. 9 shows another example of a plain structure of the discharge electrodes of the flat panel fluorescent lamp according to the first embodiment.

The structure of the first electrodes 30 and second electrodes 31 is not limited to the structure shown in FIG. 6. For example, the first electrodes 30 and the second electrodes 31 may be structured as shown in FIG. 9. In FIG. 9, the structure of the first electrodes 30 and the structure of the second electrodes 31 are the same. That is, the projections 24 are provided to each electrode at regular intervals so as to project toward alternately the left and the right of each electrode. Each projection 24 is arranged so as to face an extended or straight line portion of an adjacent electrode.

Figures 10A, 10B:
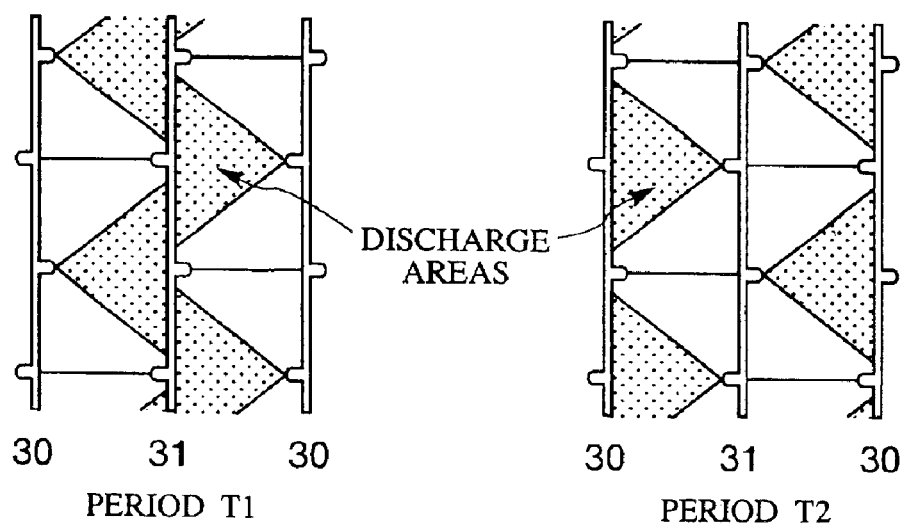
FIGS. 10A and 10B show another example of discharge areas of the flat panel fluorescent lamp according to the first embodiment.

With the structures shown in FIG. 9, during a period T1 in which a negative voltage is applied to the first electrodes 30, and a positive voltage is applied to the second electrodes 31, electric discharge is caused in a pattern shown in FIG. 10A. During a period T2 in which a positive voltage is applied to the first electrodes 30, and a negative voltage is applied to the second electrodes 31, electric discharge is caused in a pattern shown in FIG. 10B.

Second Embodiment

Figure 11:
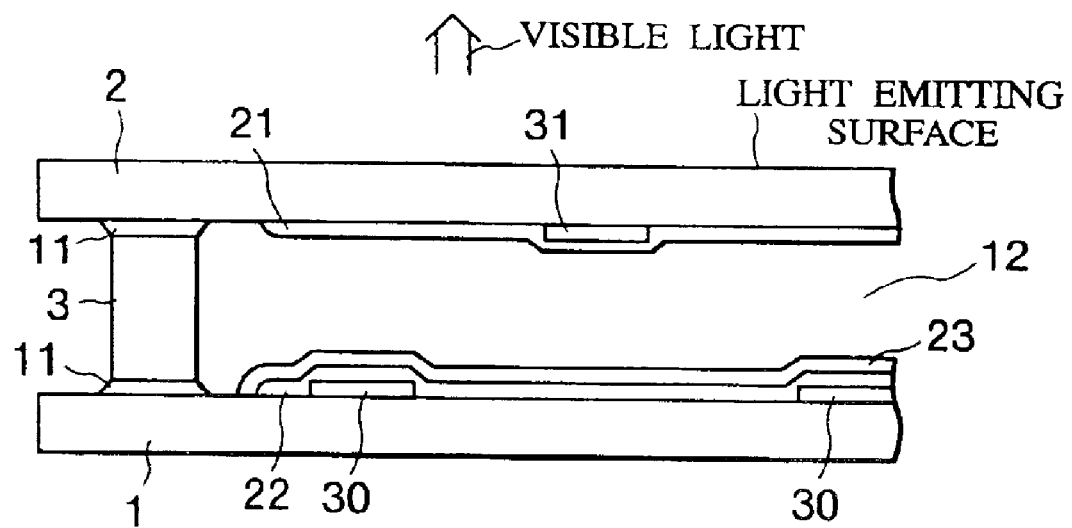
FIG. 11 shows a cross sectional structure of a flat panel fluorescent lamp according to a second embodiment of the present invention.

A flat panel fluorescent lamp 20 according to a second embodiment of the present invention will now be explained. As shown in FIG. 11, in the flat panel fluorescent lamp 20 according to the second embodiment, first electrodes 30 are placed on a lower substrate 1, and second electrodes 31 are placed on an upper substrate 2. The plan view of the arrangement of the electrodes as seen from above the flat panel fluorescent lamp 20 is the same as in case of the fluorescent lamp 20 of the first embodiment. Accordingly, during a period T1 in which a negative voltage is applied to the first electrodes 30 and a positive voltage is applied to the second electrodes 31, electric discharge is caused in a pattern shown in FIG. 8A or in FIG. 10A. During a period T2 in which a positive voltage is applied to the first electrodes 30 and a negative voltage is applied to the second electrodes 31, electric discharge is caused in a pattern shown in FIG. 8B or in FIG. 10B.

In the structure shown in FIG. 11, it is preferred that the second electrodes 31 formed on the upper substrate 2 from which the light is emitted are made of a transparent conductive material (for example, ITO (Indium Tin Oxide) or the like), since the light transmittance would be improved. With the use of a transparent conductive material, the flat panel fluorescent lamp will become more suitable as a back light.

Third Embodiment

A flat panel fluorescent lamp according to a third embodiment of the present invention will now be explained. A difference between the flat panel fluorescent lamp according to the third embodiment and that of the first and second embodiments is that the fluorescent lamp of this embodiment has three groups of electrodes.

Figure 12:
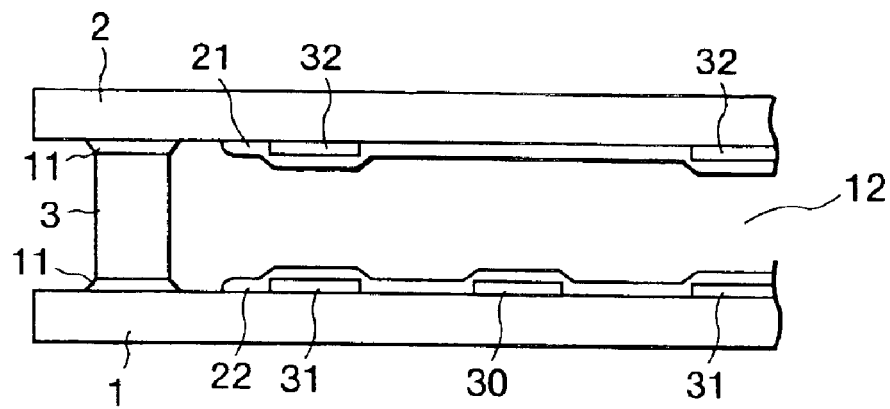
FIG. 12 shows a cross sectional structure of a flat panel fluorescent lamp according to a third embodiment of the present invention.
Figure 12A:
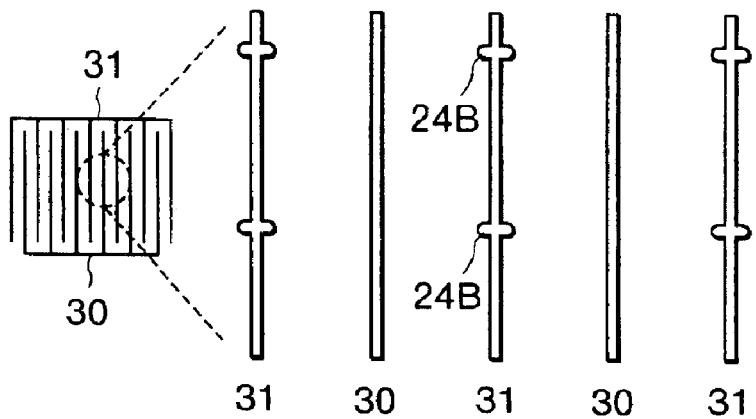
FIGS. 12A and 12B show arrangements of electrodes included in this fluorescent lamp.
Figure 12B:
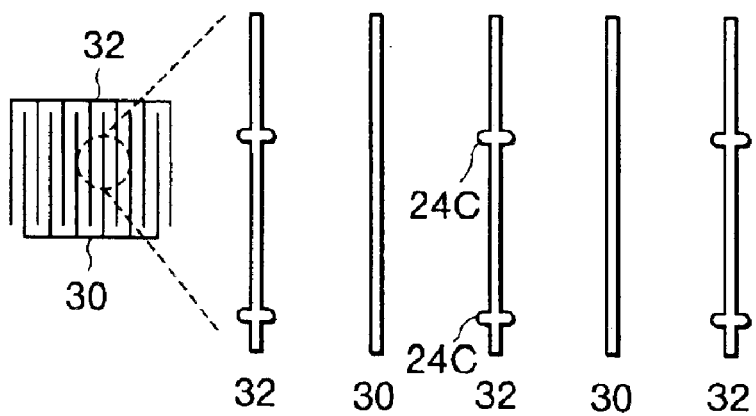

FIG. 12 shows a cross section of the flat panel fluorescent lamp of this embodiment. FIGS. 12A and 12B show arrangements of electrodes. As shown in FIG. 12A, first electrodes 30 and second electrodes 31 are alternately arranged on a lower substrate 1 almost in parallel. The first electrodes 30 are mutually connected and the second electrodes 31 a mutually connected. Third electrodes 32 are made of a transparent conductive material such as ITO, and arranged on an upper substrate 2 so as to face the second electrodes 31 as shown in FIG. 12B. The third electrodes 32 are mutually connected.

As shown in FIG. 12A, projections 24 are not provided to the first electrodes 30. Projections 24B are provided to the second electrodes 31 at predetermined intervals so as to project toward both sides (in the left and right directions in FIG. 12A).

As shown in FIG. 12B, projections 24C are provided to the third electrodes 32 at predetermined intervals so as to project toward both sides. The projections 24B of the second electrodes 31 and the projections 24C of the third electrodes 32 are arranged in a staggered state.

The substrates 1 and 2 are arranged so as to face each other, and connected by a framework member 3 to form an air-tight vessel. In the vessel, a rare gas is sealed. A dielectric layer 22 is formed on the internal surface of the lower substrate 1. A fluorescent layer 21 is formed on the internal surface of the upper substrate 2.

An operation of this flat panel fluorescent lamp will be explained.

FIGS. 13A to 13C respectively show examples of waveforms of voltages to be applied to the first to third electrodes 30 to 32. In those examples, a sinusoidal wave signal is used as a drive voltage. As shown in FIGS. 13A to 13C, a voltage E1 which is a full-wave rectified sinusoidal wave signal is applied to the first electrodes 30. A voltage E2 which is a negative polarity half-wave rectified sinusoidal wave signal is applied to the second electrodes 31. A voltage E3, which is a negative polarity half-wave rectified sinusoidal wave signal whose phase is 180° shifted from that of the voltage E2, is applied to the third electrodes 32. Frequencies of the drive voltages E1 to E3 are, for example, 20 kHz to 600 kHz.

By applying those voltages to the first to third electrodes 30 to 32, electric discharge is caused between the first electrodes 30 and the second electrodes 31 as shown in FIG. 14A during a period T1, and electric discharge is caused between the fast electrodes 30 and the third electrodes 32 as shown in FIG. 14B during a period T2. Discharge areas during a period T1 and discharge areas during a period T2 are different from each other. That is, according to this embodiment, discharge areas are alternated over a period T1 and a period T2. Therefore, when the fluorescent lamp is seen from its front surface side, the lamp is seen to be emitting light from its entire surface. Accordingly, likewise he first embodiment, a back light which has light intensity twice as large as that of a conventional one and has reduced unevenness of light intensity can be obtained.

Fourth Embodiment

A liquid crystal display device has a function for adjusting its light intensity in accordance with a usage environment or a user's preference (hereinafter this function will be referred to as a light adjusting function). This light adjusting function is performed to change the intensity of light emitted from the back light.

A flat panel fluorescent lamp having a light adjusting function will now be explained.

There are some methods for adjusting the light intensity. The most commonly used method is a PWM (Pulse Width Modulation) light adjusting method. According to this PWM light adjusting method, a period during which a voltage is applied to the discharge gas is controlled or adjusted in a predetermined cycle. The cycle (PWM cycle) in which a period for voltage application is controlled is larger than cycles (drive cycles) of lamp drive voltages shown in FIGS. 7A and 7B, and FIGS. 13A to 13C. To convert the PWM cycle into a frequency which is the reciprocal of a cycle, the frequency for PWM light adjusting (light adjusting frequency) is set to 100 Hz to 400 Hz, which is smaller than the frequencies (drive frequencies) of the lamp drive voltages, and larger than a resolution of a human eye. The light intensity is changed almost linearly according to a ratio of a voltage ON time (application time) to the ON time plus a voltage OFF time (non-application time).

Diagrams shown in FIGS. 15A and 15B illustrate the concept of the PWM light adjusting. FIGS. 15A and 15B show relations between drive frequency and light adjusting frequency in a case where a sinusoidal waveform is used as a waveform for driving the lamp. A voltage ON time is a period during which a drive voltage is applied to the discharge electrodes. A voltage OFF time is a period during which supply of a drive voltage is stopped. For example, a light adjusting degree 10% means that calculation "voltage ON time/PWM light adjusting cycle×100" is equal to 10. A light adjusting degree 100% indicates that the voltage OFF time is zero, and the light intensity of the lamp is maximum.

FIGS. 16A to 16C are diagrams showing images of drive voltages to be applied to the first to third electrodes 30 to 32 included in the flat panel fluorescent lamp having the structure shown in FIG. 12 and FIGS. 12A and 12B.

Periods during which a full-wave rectified voltage is applied to the first electrodes 30 as shown in FIG. 16A, and a half-wave rectified voltage having a negative polarity is applied to the second electrodes 31 and the third electrodes 32 alternately as shown in FIGS. 16B and 16C are electric discharge ON times. The other periods are electric discharge OFF time.

In a case where the light adjusting degree is reduced to 10% or lower in a fluorescent lamp, the electric discharge ON time generally becomes short. This makes electric discharge unstable, thereby causing a flicker in the emitted light. Therefore, the light adjusting degree cannot be lowered to 10% or under. Accordingly, the minimum light intensity cannot be lowered to 10% of the maximum light intensity or under. For example, a car navigation system requires light of 400 cd.m$^{-2}$ (candela per square meter) to be emitted from a back light in the daytime. If a lamp suitable for emitting such bright light is used in a car navigation system from such a need, the light intensity cannot be reduced to 40 cd.m$^{-2}$ or lower in the night. Therefore, a person in the car cannot see the navigation screen well in the night because the screen is too dazzling.

Therefore, according to the fourth embodiment of the present invention, when the light intensity is adjusted to the minimum level, electric discharge is turned ON in only one of the period T1 and the period T2, and electric discharge is turned OFF in the other period. That is, as shown in a table 1 below, in a case where the maximum light intensity of a conventional lamp is 100, the same light intensity can be obtained in the lamps according to the first to third embodiments of the present invention by 50% light adjustment. That is, electric discharge is turned ON in 50% of each period T1 and period T2, and electric discharge is turned OFF in the other 50% of each period T1 and period T2. And when the minimum light intensity is required, 10% light adjustment (ON time:OFF time=10:90) is applied to each period T1, and 0% light adjustment (ON time:OFF time= 0:100) is applied to each period T2. As the result of this light adjustment, light intensity which is equal to 5% of the maximum light intensity can be obtained in total. Thus, a conventional light adjusting range 100 to 10% can be expanded to 100 to 5%. Therefore, the problem of too bright light to see a car navigation screen in the nighttime can be overcome.

TABLE 1

| | Conventional lamp | Embodiments of the present invention |
|---|---|---|
| Maximum light intensity | 100 | 50 (between first and second electrodes) + 50 (between first and third electrodes) = 100 |
| Minimum light intensity | 10 | 5 (between first and second electrodes) + 0 (between first and third electrodes) = 5 |
| Light adjusting range (intensity ratio) | 10% | 5% |

If 100% light adjustment is applied to both of the period T1 and period T2 when the light intensity is set to the maximum level, the maximum light intensity is equal to 200% of the maximum light intensity of the conventional lamp. Therefore, in this case, a light adjustment range of 200 to 5% of the maximum light intensity of the conventional lamp can be obtained.

Fifth Embodiment

A fifth embodiment of the present invention relates to a flat panel fluorescent lamp which accomplishes reduced color change.

Figure 17:
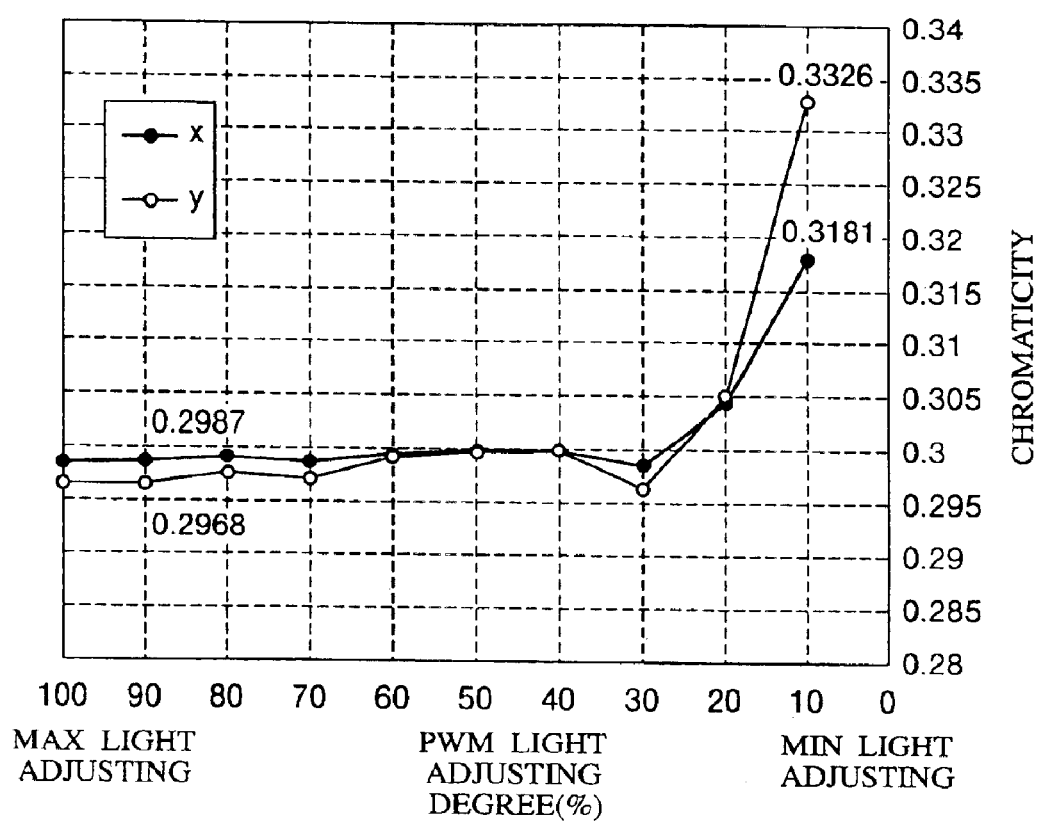
FIG. 17 shows chromaticity coordinates which indicate changes of chromaticity in relation to ON time which may be caused in a case where PWM light adjusting is applied to a conventional flat panel fluorescent lamp.
Figure 18A:
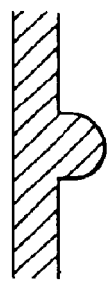
FIGS. 18A to 18E show modifications of projections of the flat panel fluorescent lamp according to the present invention.
Figure 18B:
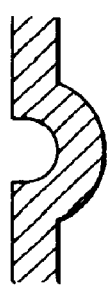
Figure 18C:
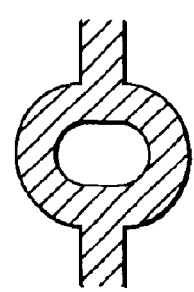
Figure 18D:
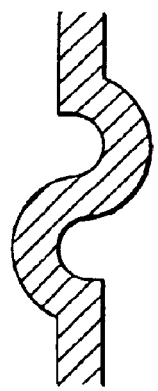
Figure 18E:
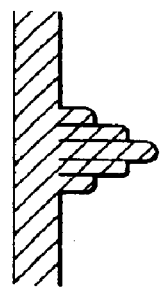

FIG. 17 shows chromaticity coordinates which indicate changes of chromaticity in relation to ON time which may be caused in a case where PWM light adjusting is applied to a conventional flat panel fluorescent lamp while the liquid crystal display panel thereof is white. It is suggested in FIG. 17 that when the ON time becomes 20% of the PWM light adjusting cycle or lower, the chromaticities x and y increase, thereby the white color of the display panel turns yellow lightly.

A reason for such a phenomenon can be considered as follows. A fluorescent lamp to be used as a back light of a liquid crystal display device usually uses a phosphor which is made of a mixture of three phosphors (R, G, and B). When PWM light adjusting is applied, electric discharge is stopped during some time. However, due to the persistence characteristic of the phosphor, light emission continues for several ms (millisecond). Persistence time varies in accordance with each of R, G, and B phosphors. Therefore, it can be considered that as the ON time becomes shorter, a balance between light emission efficiencies of the R, G, and B phosphors is changed, thereby changing the chromaticity. If such color change is caused, display quality is greatly deteriorated.

Therefore, according to the fifth embodiment of the present invention, when the lamp is to be adjusted to the minimum light intensity, a voltage to be applied to the discharge electrodes is turned OFF in one of the period T1 and the period T2 (the one of the periods is referred to as a light OFF period), and a voltage is applied to the discharge electrodes in the other period (referred to as a light ON period). Accordingly, if light is turned ON in one of the two light emitting areas (discharge areas) in accordance with 20% light adjustment, the light intensity becomes 1/10 of the maximum light intensity as a whole. This scheme is shown in a table 2 below. Since the light intensity can be lowered to 10% of the maximum while keeping the 20% light adjustment as described above, color change does not happen.

TABLE 2

|  | Conventional lamp | Embodiments of the present invention |
| --- | --- | --- |
| Maximum light intensity | 100 | 50 (between first and second electrodes) + 50 (between first and third electrodes) = 100 |
| Minimum light intensity | 10 | 10 (between first and second electrodes) + 0 (between first and third electrodes) = 10 |
| Light adjusting range (intensity ratio) | 10% | 10% |
| PWM signal ON time (application time) | 10% | 20% |

In the above-described fourth and fifth embodiments, in a case where light is turned ON in one of the two light radiating areas, unevenness of light intensity is not more reduced than unevenness caused in a conventional lamp. However, in a case where it is more important to expand the light adjusting range or to reduce color change which is caused in response to light adjustment than to reduce unevenness of light intensity, the drive methods described in the fourth and fifth embodiments may be effective.

According to the above-described embodiments, discharge areas are divided into a plurality of groups, so that light is emitted from the plurality of groups of discharge areas alternately. Accordingly, the area for electric discharge is larger than that of a conventional lamp. Thus, the discharge area seems to be widened all over the surface of the flat panel fluorescent lamp. Therefore, a lamp with reduced unevenness of light intensity can be obtained. When this lamp is used as a back light of a liquid crystal display device or the like, the brightness of the entire display screen can be made uniform.

As a result of success in reducing unevenness of light intensity, it becomes possible to make diffusion plates for reducing the unevenness of light intensity thinner, and thus to realize manufacture of a thinner and lighter liquid crystal display device and reduction in manufacturing costs.

In a case where a minimum light intensity is needed when the lamp according to this invention is used as a back light of a liquid crystal display device, expansion of a light adjusting range and reduction of color change can be realized with discharge from only one group. Therefore, the lamp of the present invention is suitable for applications such as a car navigation system or a television set for which a highly precise screen with a wide light adjusting range and reduced color change is desired.

The present invention is not limited to the above-described embodiments, but can be modified and applied in various ways.

For example, the shape of the projections 24 is not limited to the above-described one. As shown in FIGS. 18A to 18E, a semicircular shape, a semi-circumferential shape, a circumferential shape, a double semi-circumferential shape, and an integrated shape of a plurality of linear projections may be employed.

The projections 24 may not necessarily be needed in the structure of the flat panel fluorescent lamp of the present invention. Substantially the same discharge areas as those when the projections are provided can be formed by patterning of the electrodes.

Figure 19A:
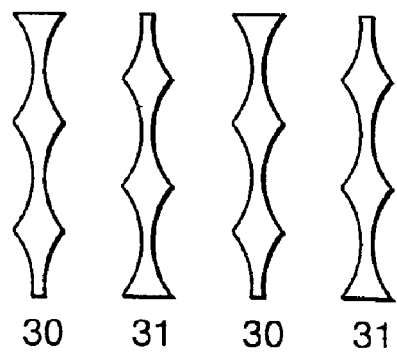
FIGS. 19A to 19D show modifications of electrodes of the flat panel fluorescent lamp according to the present invention.
Figure 19B:
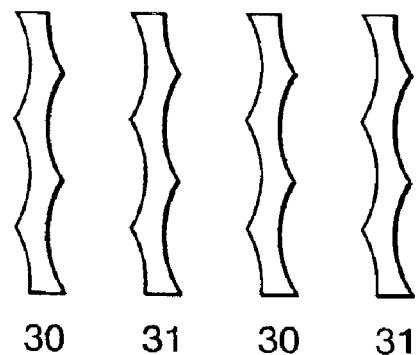
Figure 19C:
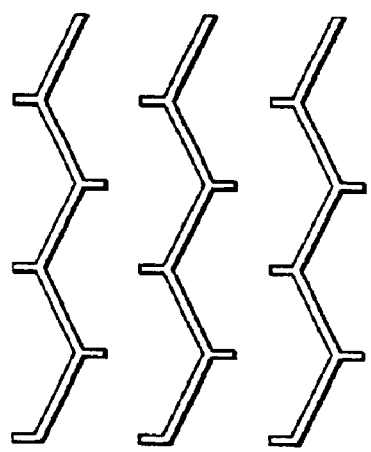
Figure 19D:
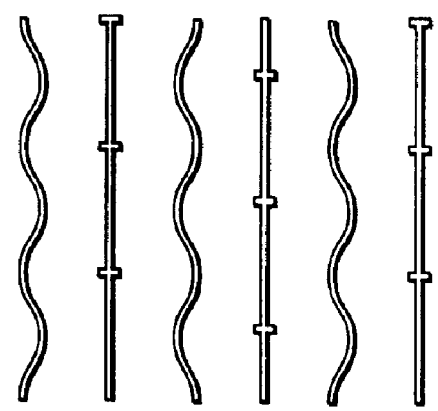

For example, as shown in FIGS. 19A and 19B, vertexes which have the shortest distance from adjacent electrodes can be formed by patterning the outlines of electrodes into series of curves arranged regularly. Electric discharge is caused from the vertexes toward adjacent electrodes radially. Thus, substantially the same discharge effect as in case of using the projections can be obtained. The same discharge effect can be obtained by using a shape of electrodes shown in FIG. 19C and a shape of electrodes shown in FIG. 19D. FIG. 19C shows a shape which is formed of a plurality of straight lines. FIG. 19D shows a shape which is formed of curves and straight lines.

The arrangements of the electrodes are not limited to the above-described embodiments.

For example, the first electrodes 30 may be arranged on one of the upper and lower substrates 1 and 2, and the second and third electrodes 31 and 32 may be arranged on the other of the upper and lower substrates 1 and 2. It is preferred that transparent electrodes may be used as the second electrodes 31, whether opaque metal for reducing electric resistance is included partially or not The electrodes may not be arranged on the internal surfaces of the substrates, but may be arranged on the external surfaces of the substrates.

Various embodiments and changes may be made thereunto without departing from the broad spirit and scope of the invention. The above-described embodiments are amended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-36028 filed on Feb. 13, 2001, and Japanese Patent Application No. 2002-4482 filed on Jan. 11, 2002 and including specification, claims, drawings and summary. The disclosures of the above Japanese Patent Applications are incorporated herein by reference in their entireties.

What is claimed is:

1. A fluorescent lamp comprising:

a first substrate;

a second substrate which is arranged so as to face said first substrate;

a discharge gas which is sealed between said first substrate and said second substrate; and a plurality of discharge electrodes having discharge projections which are arranged on said first substrate and/or said second substrate, said projections and said discharge electrodes being substantially coplaner and said projections extending from said discharge electrodes in a direction different from a longitudinal axis of said discharge electrodes, wherein said fluorescent lamp emits light by causing electric discharge in different areas alternated in accordance with said discharge projections and voltages applied to said plurality of discharge electrodes.

2. A fluorescent lamp unit comprising:
a fluorescent lamp according to claim 1; and
a driving circuit which drives said fluorescent lamp by applying drive voltages to said discharge electrodes of said fluorescent lamp.

3. The fluorescent lamp unit according to claim 2, wherein:
said plurality of discharge electrodes include a group of first discharge electrodes, and a group of second discharge electrodes; and
said driving circuit repeats a first step and a second step, the first step causing electric discharge in first discharge areas between said first discharge electrodes and said second discharge electrodes by applying a voltage having a negative polarity to said first discharge electrodes and applying a voltage having a positive polarity to said second discharge electrodes, and the second step causing electric discharge in second discharge areas which are different from said first discharge areas at least partially and which are between said first discharge electrodes and said second discharge electrodes by applying a voltage having a positive polarity to said first discharge electrodes and applying a voltage having a negative polarity to said second discharge electrodes.

4. The fluorescent lamp unit according to claim 2, wherein:
said plurality of discharge electrodes include a group of first discharge electrodes and a group of second discharge electrodes; and
said projections of said first discharge electrodes and said projections of said second discharge electrodes are arranged so as not to face said projections of the other group of discharge electrodes.

5. The fluorescent lamp unit according to claim 4, wherein
said driving circuit applies drive voltages having polarities which are changed oppositely from each other to said first discharge electrodes and said second discharge electrodes.

6. The fluorescent lamp unit according to claim 4, wherein
both of said first discharge electrodes and said second discharge electrodes are arranged on said first substrate, or said first discharge electrodes are arranged on said first substrate and said second discharge electrodes are arranged on said second substrate.

7. The fluorescent lamp unit according to claim 4, wherein
in a case where a voltage having a negative polarity is applied to said first discharge electrodes and a voltage having a positive polarity is applied to said second discharge electrodes, electric discharge is caused in first discharge areas which are between said projections of said first discharge electrodes and said second discharge electrodes, and in a case where a voltage having a positive polarity is applied to said first discharge electrodes and a voltage having a negative polarity is applied to said second discharge electrodes, electric discharge is caused in second discharge areas which are different from said first discharge areas at least partially and which are between said projections of said second discharge electrodes and said first discharge electrodes.

8. The fluorescent lamp unit according to claim 2, wherein:
said plurality of discharge electrodes include a group of first discharge electrodes, a group of second discharge electrodes, and a group of third discharge electrodes; and
said driving circuit repeats a first discharge step and a second discharge step, the first discharge step causing electric discharge in first discharge areas between said first discharge electrodes and said second discharge electrodes by applying a drive voltage of a positive potential to one of the groups of said first discharge electrodes and second discharge electrodes and applying a drive voltage of a negative potential to the other of the groups of said first discharge electrodes and second discharge electrodes, and the second discharge step causing electric discharge in second discharge areas which are different from said first discharge areas at least partially and which are between said first discharge electrodes and said third discharge electrodes by applying a drive voltage of a positive potential to one of the groups of said first discharge electrodes and third discharge electrodes and applying a drive voltage of a negative potential to the other of the groups of said first discharge electrodes and third discharge electrodes.

9. The fluorescent lamp unit according to claim 2, wherein:
said plurality of discharge electrodes include a group of first discharge electrodes, a group of second discharge electrodes, and a group of third discharge electrodes;
said first discharge electrodes and said second discharge electrodes are arranged on said first substrate, and said third discharge electrodes are arranged on said second substrate; and
the group of said second discharge electrodes and the group of said third discharge electrodes respectively have projections which are arranged so as not to overlap with said projections of the other group.

10. The fluorescent lamp unit according to claim 9, wherein
said third discharge electrodes are arranged on said second substrate so as to almost face said second discharge electrodes.

11. The fluorescent lamp unit according to claim 9, wherein
said driving circuit applies a drive voltage of a negative potential to said second discharge electrodes and said third discharge electrodes alternately, and while applying a drive voltage of a negative potential to said second discharge electrodes or said third discharge electrodes, applies a drive voltage of a positive potential to said first discharge electrodes.

12. A liquid crystal display device comprising the fluorescent lamp unit according to claim 2 as a back light.

13. The liquid crystal display device according to claim 12, wherein said fluorescent lamp emits light by causing electric discharge in first discharge areas between said first discharge electrodes and said second discharge electrodes and in second discharge areas which are different from said first discharge areas at least partially and which are between said first discharge electrodes and said third discharge electrodes selectively in accordance with polarities of voltages applied to said plurality of discharge electrodes.

14. The liquid crystal display device according to claim 13, wherein
said driving circuit applies to said plurality of discharge electrodes, drive voltages for turning on both of said first and second discharge areas when light intensity of said back light is at a maximum level, and drive voltages for turning off one of said first and second discharge areas when light intensity of said back light is at a minimum level.

15. The liquid crystal display device according to claim 12, wherein
said driving circuit applies to said plurality of discharge electrodes, drive voltages for controlling said first and second discharge areas to emit light during 50% of a predetermined period, when light intensity of said back light is at a maximum level.

16. The liquid crystal display device according to claim 12, wherein
said driving circuit applies to said plurality of discharge electrodes, drive voltages for turning on one of said first and second discharge areas and also for controlling the discharge areas which are turned on to emit light during 10% of a predetermined period, when light intensity of said back light is at a minimum level.

17. The liquid crystal display device according to claim 12, wherein
said driving circuit controls one of said first and second discharge areas to emit light by causing electric discharge during 20% of a predetermined period, when light intensity of said back light is at a minimum level.

18. The liquid crystal display device according to claim 12, wherein
said driving circuit controls both of said first and second discharge areas to emit light by causing electric discharge during 100% of a predetermined period, when light intensity of said back light is at a maximum level.

19. The fluorescent lamp unit according to claim 2, wherein
a reflection film is adhered to said first substrate.

20. The fluorescent lamp unit according to claim 2, wherein
said second or third discharge electrodes are made of a transparent conductive material in a case where they are arranged on said second substrate.

21. A method of emitting light from a lamp (back light) in which a discharge gas is sealed, and first and second discharge electrodes are formed, said method comprising:
causing electric discharge in first discharge areas between the first and second discharge electrodes in accordance with discharge projections of said first discharge electrodes by applying a voltage having a negative polarity to the first discharge electrodes and a voltage having a positive polarity to the second discharge electrodes, and converting ultraviolet rays caused by the electric discharge into visible light through a phosphor, said projections and said discharge electrodes being substantially coplaner and said projections extending from said discharge electrodes in a direction different from a longitudinal axis of said discharge electrodes;
causing electric discharge in second discharge areas which are different from the first discharge areas at least partially and which are between the first and second discharge electrodes in accordance with discharge projections of said second discharge electrodes by applying a voltage having a positive polarity to the first discharge electrodes and a voltage having a negative polarity to the second discharge electrodes, and converting ultraviolet rays caused by the electric discharge into visible light through the phosphor; and
controlling said causing electric discharge in the first discharge areas and said causing electric discharge in the second discharge areas to be repeated.

22. The method of emitting light according to claim 21, wherein
in said controlling, it is controlled that drive voltages for turning on both of the first and second discharge areas are applied to the first and second discharge electrodes when light emission intensity is at a maximum level, and that drive voltages for turning off one of the first and second discharge areas are applied to the first and second discharge electrodes when light emission intensity is at a minimum level.

23. The method of emitting light according to claim 21, wherein
in said controlling, it is controlled that drive voltages for turning on one of the first and second discharge areas and for controlling the discharge areas which are turned on to emit light during 10% of a predetermined period are applied to the first and second discharge electrodes when light intensity of the back light is at a minimum level.

24. The method of emitting light according to claim 21, wherein
in said controlling, one of the first and second discharge areas are controlled to emit light by causing electric discharge during 20% of a predetermined period when light intensity of the back light is at a minimum level.

25. A method of emitting light from a lamp (back light) in which a discharge gas is sealed, and first discharge electrodes, second discharge electrodes, and third discharge electrodes are formed, said method comprising:
causing electric discharge in first discharge areas between the first and second discharge electrodes in accordance with discharge projections of said second discharge electrodes by applying a drive voltage of a positive potential to one of the first and second discharge electrodes and a drive voltage of a negative potential to the other of the first and second discharge electrodes, and converting ultraviolet rays caused by the electric discharge into visible light through a phosphor, said projections and said discharge electrodes being substantially coplaner and said projections extending from said discharge electrodes in a direction different from a longitudinal axis of said discharge electrodes;
causing electric discharge in second discharge areas which are different from the first discharge areas at least partially and which are between the first and third discharge electrodes in accordance with discharge projections of said third discharge electrodes by applying a drive voltage of a positive potential to one of the first and third discharge electrodes and a drive voltage of a negative potential to the other of the first and third discharge electrodes, and converting ultraviolet rays caused by the electric discharge into visible light via the phosphor; and
controlling said causing electric discharge in the first discharge areas and said causing electric discharge in the second discharge areas to be repeated.

26. The method of emitting light according to claim 25, wherein
in said controlling, it is controlled that drive voltages for turning on both of the first and second discharge areas are applied to the first to third discharge electrodes when light emission, intensity is at a maximum level, and that drive voltages for turning off one of the first and second discharge areas are applied to the first to third discharge electrodes when light emission intensity is at a minimum level.

27. The method of emitting light according to claim 25, wherein
in said controlling, it is controlled that drive voltages for turning on one of the first and second discharge areas and for controlling the discharge areas which are turned on to emit light during 10% of a predetermined period are applied to the first to third discharge electrodes when light intensity of the back light is at a minimum level.

28. The method of emitting light according to claim 25, wherein in said controlling, one of the first and second discharge areas are controlled to emit light by causing electric discharge during 20% of a predetermined period when light intensity of the back light is at a minimum level.

29. A fluorescent lamp comprising:

a first substrate;

a second substrate which is arranged so as to face said first substrate;

a discharge gas which is sealed between said first substrate and said second substrate; and a plurality of discharge electrodes having discharge projections which are arranged on said first substrate and/or said second substrate, wherein said fluorescent lamp emits light by causing electric discharge in different areas alternated in accordance with said discharge projections and voltages applied to said plurality of discharge electrodes and wherein said discharge projections have a shape selected from at least one of: a semicircular shape, a semi-circumferential shape, a circumferential shape, a double semi-circumferential shape, and an integrated shape of one or more linear projections.

30. A method of emitting light from a lamp (back light) in which a discharge gas is sealed, and first and second discharge electrodes are formed, said method comprising:

causing electric discharge in first discharge areas between the first and second discharge electrodes in accordance with discharge projections of said first discharge electrodes by applying a voltage having a negative polarity to the first discharge electrodes and a voltage having a positive polarity to the second discharge electrodes, and converting ultraviolet rays caused by the electric discharge into visible light through a phosphor;

causing electric discharge in second discharge areas which are different from the first discharge areas at least partially and which are between the first and second discharge electrodes in accordance with discharge projections of said second discharge electrodes by applying a voltage having a positive polarity to the first discharge electrodes and a voltage having a negative polarity to the second discharge electrodes, and converting ultraviolet rays caused by the electric discharge into visible light through the phosphor; and controlling said causing electric discharge in the first discharge areas and said causing electric discharge in the second discharge areas to be repeated, wherein said discharge projections have a shape selected from at least one of: a semicircular shape, a semi-circumferential shape, a circumferential shape, a double semi-circumferential shape, and an integrated shape of one or more linear projections.

31. A method of emitting light from a lamp (back light) in which a discharge gas is sealed, and first discharge electrodes, second discharge electrodes, and third discharge electrodes are formed, said method comprising:

causing electric discharge in first discharge areas between the first and second discharge electrodes in accordance with discharge projections of said second discharge electrodes by applying a drive voltage of a positive potential to one of the first and second discharge electrodes and a drive voltage of a negative potential to the other of the first and second discharge electrodes, and converting ultraviolet rays caused by the electric discharge into visible light through a phosphor;

causing electric discharge in second discharge areas which are different from the first discharge areas at least partially and which are between the first and third discharge electrodes in accordance with discharge projections of said third discharge electrodes by applying a drive voltage of a positive potential to one of the first and third discharge electrodes and a drive voltage of a negative potential to the other of the first and third discharge electrodes, and converting ultraviolet rays caused by the electric discharge into visible light via the phosphor; and controlling said causing electric discharge in the first discharge areas and said causing electric discharge in the second discharge areas to be repeated, wherein said discharge projections have a shape selected from at least one of: a semicircular shape, a semi-circumferential shape, a circumferential shape, a double semi-circumferential shape, and an integrated shape of one or more linear projections.

* * * * *